Nov. 8, 1938.　　　　G. B. GORDON　　　　2,135,937
COUPLING FOR WIRES OR ELECTRICAL CONDUCTORS
Filed March 25, 1937

INVENTOR
*G. B. Gordon*
BY *James E. Lynch*
ATTORNEY

Patented Nov. 8, 1938

2,135,937

UNITED STATES PATENT OFFICE 2,135,937

COUPLING FOR WIRES OR ELECTRICAL CONDUCTORS

George B. Gordon, New York, N. Y.

Application March 25, 1937, Serial No. 132,912

1 Claim. (Cl. 173—263)

This invention consists of an improvement in couplings used for joining wires or electrical conductors so as to make rigid electrical and mechanical connections between them.

It has been found in the use of couplings for wires or electrical conductors that due to vibration, or other causes, loose connections occur between the wires or conductors thus lessening their efficiency or conductivity and often resulting in complete separation of the wires or conductors.

Accordingly, it is one of the objects of this invention to provide a coupling which will resist vibration and strains incidental to service, and will furnish a reliable and positive connection between the wires or electrical conductors.

Another object is to provide a coupling which will insure maximum conductivity and minimum contact resistivity between electrical conductors.

A further object is to provide a coupling for wires or electrical conductors which may be readily applied thereto or removed therefrom at will.

Figure 1:
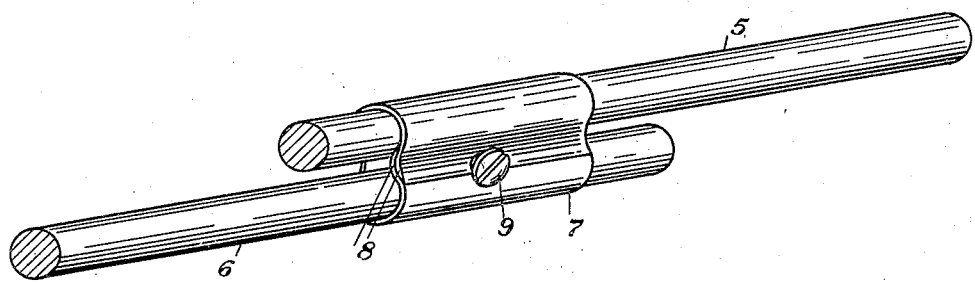
Figure 2:
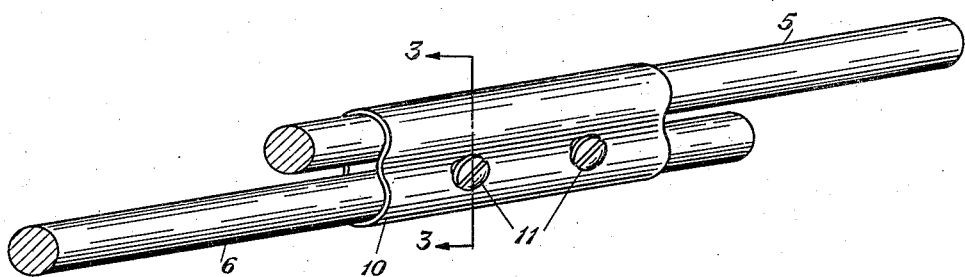
Figures 3, 4:
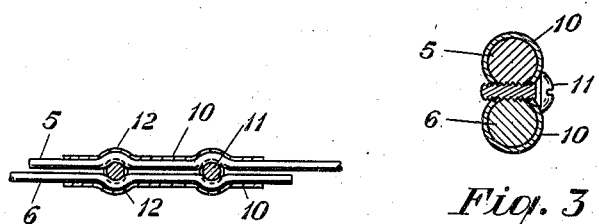

These and further objects will be apparent from the following description when considered in connection with the accompanying drawing in which certain forms of the invention are illustrated, Figures 1 and 2 showing perspectives of two embodiments of the invention; Fig. 3 a cross-sectional view along the line 3—3 of Fig. 2; and Fig. 4 is a sectional view emphasizing the offsets made in the wires and sleeve by the pressure exerted by an entering screw, the screw being removed for the sake of clearness.

Referring to the drawing, Fig. 1 shows a pair of parallel terminating wires 5 and 6 connected by a wrapping 7 of copper or other comparatively thin metal which is formed into a tubular sleeve portion for each wire and with the opposite sides of the constricted portion of the wrapping interconnected by a screw threaded through the adjacent surfaces of the wires to form a threaded groove therein.

Fig. 2 is a modification of Fig. 1, showing a preformed sleeve having a tubular portion for each wire with a pair of screws engaging the sleeves and wires similarly to Fig. 1. The sectional view shown in Fig. 3 illustrates the manner in which the screw is threaded through the sleeve and between the wires, and the sectional view shown in Fig. 4 emphasizes the offset relation of the sleeve and conductors after the passage of the screws therethrough.

In Fig. 1 of the drawing the pair of adjacent or parallel wires or conductors 5 and 6 are shown extending through the sleeve 7. This sleeve is made from comparatively thin material, such as sheet copper, which is wrapped about the conductors 6 and 7 so as to form two parallel and substantially tubular portions, as already noted. These portions conform to the shape of the wires 5 and 6, respectively, which they tightly embrace. The longitudinal edges 8 of said portions overlap each other sufficiently to provide adequate area to insure proper conductivity between the overlapping portions of said edges. A screw or other helically threaded member 9 is inserted through the sleeve 7 in a direction perpendicular to the physical direction of the electrical conductors 5 and 6, as described more fully hereinafter.

The sleeve has coinciding openings in its opposite sides and the diameter of these openings is slightly more than the root, internal or minimum diameter of the screw 9. The screw is hardened or otherwise treated so that it is harder than mild steel. Material such as "beryllium" copper has been found suitable for this purpose. The screw 9, being of harder material than the sleeve 7 and the electrical conductors 5 and 6, which are made of copper, will force or displace the metal of the sleeve and conductors into the pits of the screw threading. In other words, the screw has a similar action to a thread rolling die, except that the operation is reversed and the screw forms the interior thread by rolling or extruding the metal composing the conductors and sleeve into the pits of the threading. It will be noted that no metal is removed or cut away such as would be the case if the action were similar to a tap. This is important due to the fact that no metal is removed from the electrical conductors and the conductivity remains the same as before the metal was distorted by the pressure of the entering screw. Thus as the screw is forced between the parallel wires, and with its point penetrating opposite sides of the sleeve, it will closely mesh with the threaded groove which it forms in the contiguous surfaces of the wires, and will establish a "cold weld" or a precision fit with said wires and sleeves.

In case the improved device is to be used with insulated wires enough of this insulation is removed from the wires prior to their application to pare their ends for a sufficient distance to permit them to be inserted in the opposite ends of the sleeve.

In the modification of the invention illustrated in Fig. 2, the wires 5 and 6 are arranged similarly to that illustrated and described in connection with Fig. 1. In Fig. 2, however, the sleeve 10 is preshaped to conform to the contour of the two parallel wires 5 and 6. The tubular portions of the sleeve are of such size as to grip the wires in strong frictional engagement, thus insuring a firm mechanical and electrical contact therewith. It is important to notice in this connection, and as more clearly shown in the enlarged view of the coupled wires, indicated in Fig. 4 of the drawing, that as the screw or screws pass through the parallel wires, these wires are forced outwardly. This displacement causes an offset in the wires or conductors and a corresponding offset in the sleeve or coupling, as indicated at 12, 12 in Fig. 4.

The "cold weld" or precision fit, previously referred to, seals the points of contact where the thread of the screw 9, or the screws 11, 11 displace or extrude the metal of the sleeve and parallel conductors, thus preventing electrolytic corrosion due to the presence of moisture or reduced conductivity due to poor contact.

As shown in Fig. 3, the screw (or screws) is rolled through the sleeve and between the adjacent surfaces of the closely spaced conductors so as to extrude metal from the conductors in order that the threads of the screw will be made to closely fit and mesh with the adjacent sides of the conductors. This arrangement will provide contact over a large area between the threaded portion of the screw and the adjacent conductor surfaces and will hence resist any loosening effect during vibration. Pressure is also applied to the head of the screw (by a screw-driver or by other means) so that the underside of the screw-head will contact the sleeve and will be maintained in such contact under high pressure by reason of the friction between the sleeve and the screw-head. This pressure of the screw-head against the sleeve is applied over a sufficient area so that it will further prevent any loosening during vibration. This arrangement above-described will maintain high conductivity between the conductors through the coupling means under all conditions met in practice. The contact between the screw-head and the sleeve at the same time will give the effect of a lock-washer.

In short, the arrangement above-described provides two important conjoint contacts for maintaining the wires or conductors in electrical and mechanical relationship: (1) the contact over a substantial area between the threaded portion of the screw and the walls of the wires or conductors which abut the screw, and (2) the contact over a substantial area between the underside of the screw-head and the sleeve.

While the arrangements of this invention have been illustrated as embodied in certain specific forms which have been deemed desirable, it will be understood that they are capable of embodiment in many and widely vairied forms without departing from the spirit of the invention as defined in the appended claim.

What is claimed is:

The combination of two spaced conductors, a sleeve having parallel tubular portions tightly embracing the conductors and limiting the outward displacement thereof, a constricted portion for the sleeve lying between the tubular portions and having coinciding apertures provided therethrough, and screws of a material harder than said sleeve and said conductors inserted under pressure between the conductors and through the coinciding apertures in the constricted portion to a point where their heads contact against said sleeve, said screws in their passage extruding metal from the conductors and forming grooves in the adjacent surfaces thereof, said screws forming a unitary structure between the tubular sleeve and the conductors to hold them in intermeshed relation with each other through the screws and to provide increased conductivity between the conductors and the sleeve, the undersides of the screw-heads being tightly contacted under high pressure against the sleeve so as to lock the screws in positive engagement to prevent loosening of the electrical and mechanical contact during vibration.

GEORGE B. GORDON.